C. A. SCHENKEL.
VEHICLE TIRE.
APPLICATION FILED SEPT. 3, 1910.

1,021,072.

Patented Mar. 26, 1912.

WITNESSES:
N. Abramson
A. McCarthy

INVENTOR
Charles Adam Schenkel
BY
McMaster
Attorney

UNITED STATES PATENT OFFICE.

CHARLES ADAM SCHENKEL, OF WABASH, INDIANA.

VEHICLE-TIRE.

1,021,072.

Specification of Letters Patent.   Patented Mar. 26, 1912.

Application filed September 3, 1910. Serial No. 580,291.

*To all whom it may concern:*

Be it known that I, CHARLES ADAM SCHENKEL, a citizen of the United States, and a resident of Wabash, in the county of Wabash and State of Indiana, have invented certain new and useful Improvements in Vehicle-Tires, of which the following is a specification, reference being had to the accompanying drawings.

This invention relates to certain novel improvements in airless tires.

The primary object of my invention is to provide a comparatively inexpensive cushion tire, which will practically possess all the elasticity and resilience of an air inflated tube, without being subjected to the possibility of becoming useless through a puncture.

A further object is to provide a cushion tire including a tube having an augmented tread and coupling, and a spring element tending to keep the tire distended and elastic.

With these and other objects in view the present invention consists in the combination and arrangement of parts as will be hereinafter more fully described and particularly pointed out in the appended claim, it being understood that changes in the specific structure shown and described, may be made within the scope of the claim, without departing from the spirit of the invention.

Figure 1:
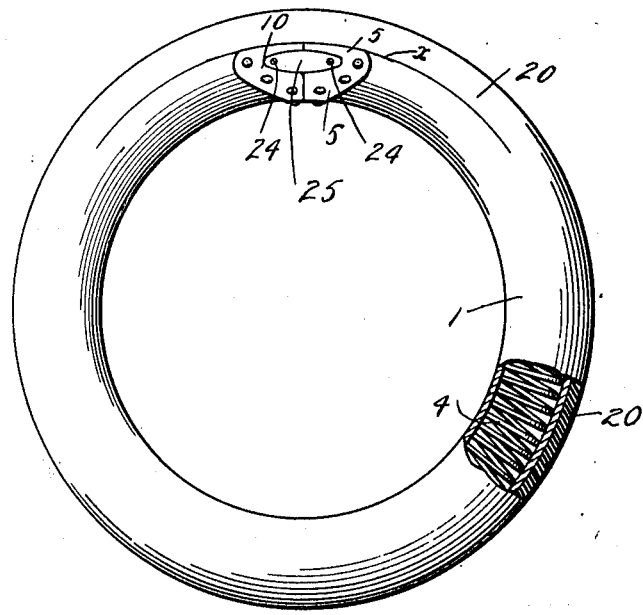
Figure 2:
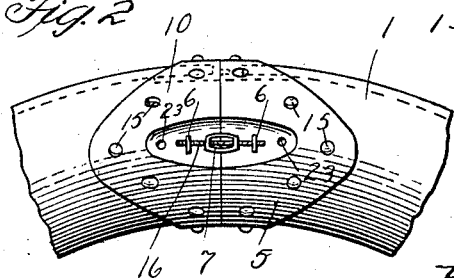
Figure 3:
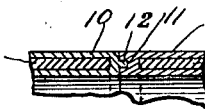
Figure 4:
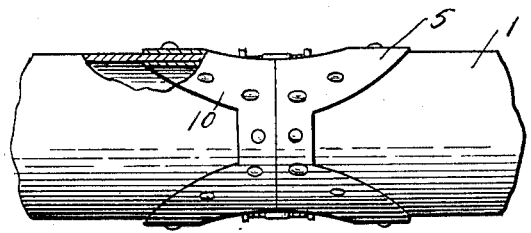
Figure 5:
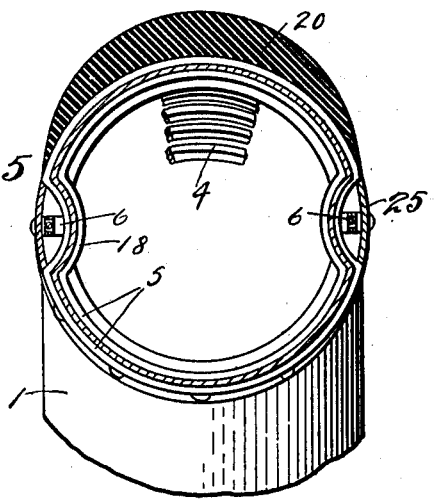

In the accompanying drawings forming a part of this specification, and in which like numerals of reference indicate similar parts in the several views:—Figure 1, shows a side elevational view of a tire with portions broken away, embodying my invention. Fig. 2, shows a broken view disclosing the coupling. Fig. 3, shows a fragmentary view through the coupling. Fig. 4, shows a top view of the coupling, while Fig. 5, shows a sectional view of the tire.

In my present invention I provide a tire especially adapted to be used in connection with touring cars, motor cycles and vehicles employed in road and country travel.

The numeral, 1, indicates a tube tire body which has its two ends fitted into two draw or coupling collars, marked 5 and 10. The draw or coupling collars are hollow, as shown in Fig. 3, to snugly receive the ends of the tube, 1. In order to insure these draw collars being securely held in juxtaposition and in alinement, I provide the collar, 5, with the annular groove, 11, within which groove the projecting flange, 12, snugly fits, this flange projecting from the collar, 10, as shown in Fig. 3. The tube, 1, is held to the collars by means of the screws, 15.

As shown in the drawings, each draw collar upon the side is provided with a depression, within which depressions are located the screw eyes, 6. Each collar has two sets of depressions, as is shown for instance in Fig. 5. Threading into the screw eyes, 6, is a screw, 16, having the operating handle, 7, this screw, 16, having its ends threaded in opposite directions, so that in turning same, the stem will simultaneously thread into the two screw eyes, 6. Two such screws, 16, are used and by means of these, the collars are securely held together. These collars are made of extremely thin material and the depression formed by means of the inwardly curved metal, 18, performs a double function, in that the collars can be compressed within certain limits. Held within the tube, 1, is a coil spring, 4, this spring being made of wire square in cross section, so that the spring presents a flat surface to the tube, 1, as is shown in Fig. 1. This spring is of uniform construction throughout, the said construction being clearly exposed in Fig. 1 of the drawings.

Suitably secured to the tube, 1, is a tread, 20, this tread being crescent shape, as is shown in Fig. 5. The tread, 20, is in the form of a complete annulus, and is vulcanized or otherwise secured to the tube, 1. The ends of the tube, 1, however, are not vulcanized or secured to the tread, 20, so that these ends can be removed from below the tread, permitting the insertion or removal of the coil spring, 4. The collars, 5 and 10, are provided with the threaded openings, 23, arranged to receive suitable screws, 24, by means of which a cap plate, 25, is secured to these collars, in the manner shown in Fig. 1. The spring, 4, is made of any suitable material and is of such a diameter as to resiliently carry the maximum load likely to be placed upon the vehicle to which the tire is secured.

From the foregoing it will be noticed that after the collars have been forced under the tread, 20, the same can not become casually displaced. The tread, 20, being continuous and the collars, 5 and 10, being resilient, no appreciable jar is felt when the collars come at the lowest point of the wheel.

An airless tire constructed according to my invention is simple and inexpensive in construction, and both durable and efficient in operation, and the adjustment of the collars and the insertion of the spring may be made with ease, accuracy, and despatch.

Having thus described my said invention, what I claim as new and desire to secure by United States Letters Patent, is:—

The combination with a tube of two hollow resilient collars, each collar having oppositely disposed inwardly directed indentations, a screw-eye secured within each indentation, a draw bolt passing through said screw-eyes, one of said collars having a flange and the other collar having a groove for co-action with said flange, and a tread partly secured to said tube.

In testimony whereof, I affix my signature in presence of two witnesses.

CHARLES ADAM SCHENKEL.

Witnesses:
 JOSEPH L. RUDIG,
 J. W. MURPHY.

Copies of this patent may be obtained for five cents each, by addressing the "Commissioner of Patents, Washington, D. C."